United States Patent
Yin et al.

(10) Patent No.: US 12,531,718 B2
(45) Date of Patent: Jan. 20, 2026

(54) METHODS, APPARATUSES, AND COMPUTER READABLE MEDIUM FOR COMMUNICATION IN PASSIVE OPTICAL NETWORK

(71) Applicant: Nokia Solutions and Networks Oy, Espoo (FI)

(72) Inventors: Qin Yin, Shanghai (CN); Xin Wang, Shanghai (CN); Lifei Sun, Shanghai (CN); Jie Liu, Shanghai (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 667 days.

(21) Appl. No.: 17/954,930

(22) Filed: Sep. 28, 2022

(65) Prior Publication Data
US 2023/0103599 A1    Apr. 6, 2023

(30) Foreign Application Priority Data

Sep. 30, 2021   (CN) .......................... 202111159127.4

(51) Int. Cl.
*H04L 7/04* (2006.01)
*H04Q 11/00* (2006.01)

(52) U.S. Cl.
CPC ........... *H04L 7/04* (2013.01); *H04Q 11/0067* (2013.01); *H04Q 2011/0064* (2013.01)

(58) Field of Classification Search
None
See application file for complete search history.

(56) References Cited

FOREIGN PATENT DOCUMENTS

CN           102237940 A  * 11/2011
WO      WO-2013/191608 A1   12/2013

OTHER PUBLICATIONS

ITU-T G.988 NPL "ONU management and control interface (OMCI) specification Amendment 2", Jun. 2012, Series G: Transmission Systems and Media, Digital Systems and Networks; Digital sections and digital line system—Optical line systems for local and access networks; pp. 1-32 (Year: 2012).*

(Continued)

*Primary Examiner* — David W Lambert
(74) *Attorney, Agent, or Firm* — Harness, Dickey & Pierce, P.L.C.

(57) ABSTRACT

The present disclosure relates to methods, apparatuses, and computer readable medium for communication in a passive optical network. According to an embodiment, a method for communication implemented at an optical network unit may includes receiving an optical network unit management and control interface (OMCI) message from an optical line terminal, the OMCI message including configuration information on a synchronization status message incoming (SSM-IN) managed entity; receiving synchronization status information from the optical line terminal; and processing the received synchronization status information according to the configuration of the SSM-IN managed entity.

20 Claims, 7 Drawing Sheets

(56) References Cited

OTHER PUBLICATIONS

"ONU management and control interface (OMCI) specification;G. 988", ITU-T Draft; Study Period 2021-2024; Study Group 15; Series G.988, International Telecommunication Union, Geneva; CH vol. 2/15 Aug. 10, 2022 (Aug. 10, 2022), pp. 1-706, XP044333045, Retrieved from the Internet: URL:https://www-api.itu.int/ifa/t/2017/sg15/exchange/wp1 /q2/G.988%20editing/G.988-202209-Markup-v1 . docx [retrieved on Aug. 10, 2022].

Search Report for European Application No. 22199063.3 dated Feb. 16, 2023.

\* cited by examiner

METHODS, APPARATUSES, AND COMPUTER READABLE MEDIUM FOR COMMUNICATION IN PASSIVE OPTICAL NETWORK

CROSS-REFERENCE TO RELATED APPLICATIONS

This application claims priority to and the benefit of Chinese Patent Application No. 202111159127.4 filed on Sep. 30, 2021, the entire contents of which are incorporated herein by reference.

TECHNICAL FIELD

The present disclosure relates generally to the field of communication technologies, and more particularly, to methods, apparatuses, and computer readable medium for communication in a passive optical network.

BACKGROUND

This section is intended to provide a background or context of the exemplary embodiments that will be disclosed below. The description herein may include concepts that may be pursued, but are not necessarily ones that have been previously conceived, implemented, or described. Therefore, unless otherwise explicitly indicated herein, the description of this section is not prior art with respect to the present disclosure and is not admitted to be prior art by inclusion in this section.

The synchronous Ethernet is a technology for recovering a clock by adopting an Ethernet link code stream, which is abbreviated as SyncE. The synchronous Ethernet utilizes an Ethernet physical layer chip to insert additional clock information bits into a transmitted data code stream at a transmitting end, and recovers the clock information from the transmitting end at a receiving end, so that the required synchronization is achieved at the physical layer. At this time, the clock quality of the receiving end is the same as that of the transmitting end. The transmitting end also provides a synchronization status message (SSM) indicating a clock quality level to the receiving end to allow the receiving end to have the best clock source traceability so as to correctly define a timing source and prevent from occurrence of a timing loop.

As one of the physical layer synchronous network elements, passive optical network (PON) systems such as GPON, XGPON and NGPON2 also support synchronous Ethernet technology by means of PON hardware.

Certain abbreviations that may be found in the present disclosure or its context are herewith defined as follows:
GEM GPON Encapsulation Method
GPON Gigabit-capable PON
ME Managed Entity
NGPON2 Next Next GPON
OAN Optical Access Network
ODN Optical Distribution Network
OLT Optical Line Terminal
OMCI ONU Management and Control Interface
ONT Optical Network Terminal
ONU Optical Network Unit
PLOAM Physical Layer Operation, Administration and Maintenance
PON Passive Optical Network
PPTP Physical Path Termination Point
SyncE Synchronous Ethernet
SSM Synchronization Status Message
TP Termination Point
UNI User Network Interface
XGPON 10-Gigabit-capable PON

SUMMARY

According to a first aspect of the present disclosure, a method for communication implemented at an optical network unit is provided. The method may comprise: receiving an optical network unit management and control interface (OMCI) message from an optical line terminal, the OMCI message comprising configuration information on a synchronization status message incoming (SSM-IN) managed entity; receiving synchronization status information from the optical line terminal; and processing the received synchronization status information according to the configuration of the SSM-IN managed entity.

According to a second aspect of the present disclosure, an optical network unit is provided. The optical network unit may comprise: at least one processor; and at least one memory having stored thereon instructions that, when executed by the at least one processor, cause the optical network unit to perform the method as described above.

According to a third aspect of the present disclosure, an apparatus for communication implemented at an optical network unit is provided. The apparatus may comprise: a first receiving module for receiving an optical network unit management and control interface (OMCI) message from an optical line terminal, the OMCI message comprising configuration information on a synchronization status message incoming (SSM-IN) managed entity; a second receiving module for receiving synchronization status information from the optical line terminal; and a first processing module for processing the received synchronization status information according to the configuration of the SSM-IN managed entity.

According to a fourth aspect of the present disclosure, a computer readable medium is provided. The computer readable medium may have stored thereon instructions that, when executed by at least one processor in an optical network unit, cause the optical network unit to perform the method as described above.

According to a fifth aspect of the present disclosure, a method for communication implemented at an optical line terminal is provided. The method may comprise: transmitting an optical network unit management and control interface (OMCI) message to an optical network unit, the OMCI message comprising configuration information on a synchronization status message incoming (SSM-IN) managed entity; and transmitting synchronization status information to the optical network unit.

According to a sixth aspect of the present disclosure, an optical line terminal is provided. The optical line terminal may comprise: at least one processor; and at least one memory having stored thereon instructions that, when executed by the at least one processor, cause the optical line terminal to perform the method as described above.

According to a seventh aspect of the present disclosure, an apparatus for communication implemented at an optical line terminal is provided. The apparatus may comprise: a first transmitting module for transmitting an optical network unit management and control interface (OMCI) message to an optical network unit, the OMCI message comprising configuration information on a synchronization status message incoming (SSM-IN) managed entity; and a second transmitting module for transmitting synchronization status information to the optical network unit.

According to an eighth aspect of the present disclosure, a computer readable medium is provided. The computer readable medium may have stored thereon instructions that, when executed by at least one processor in an optical line terminal, cause the optical line terminal to perform the method as described above.

DETAILED DESCRIPTION

Herein below, exemplary embodiments will be described in more detail with reference to the accompanying drawings. It shall be understood that the present disclosure should not be construed as limited to the exemplary embodiments described herein, but may be implemented in various other forms, and these exemplary embodiments are provided merely to provide a more thorough and comprehensive understanding of the present disclosure. It shall also be understood that the drawings of the present disclosure are given by way of example only, and are not intended to limit the precise forms of the embodiments or to limit the scope of protection of the present disclosure.

Figure 1:
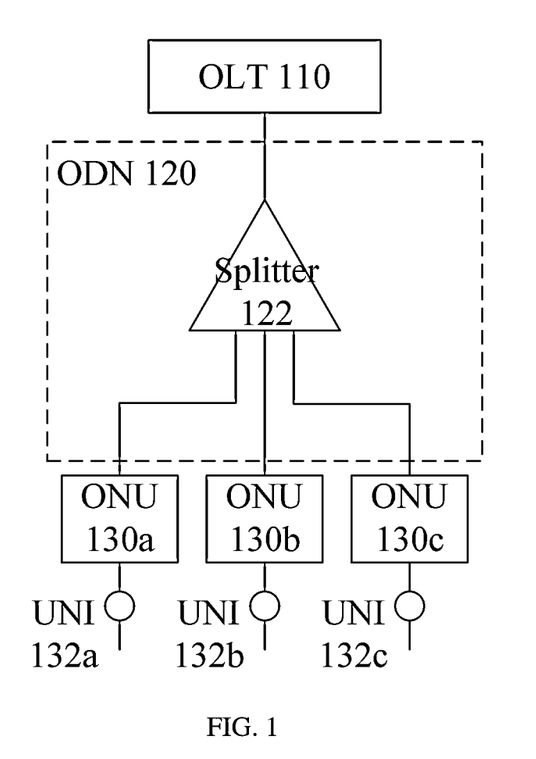
FIG. 1 illustrates a schematic diagram of a communication system in which an exemplary embodiment of the present disclosure may be implemented.

FIG. 1 illustrates a schematic diagram of a passive optical network (PON) communication system 100 in which exemplary embodiments of the present disclosure may be implemented. As shown in FIG. 1, the passive optical network 100 may comprise an optical line terminal (OLT) 110 and a plurality of optical network units (ONU) or optical network terminals (ONT) 130 in communication with the optical line terminal 110 through an optical distribution network (ODN) 120. For convenience of description, only the optical network unit is described hereinafter, but it should be understood that it also covers embodiments of an optical network terminal.

Figure 2:
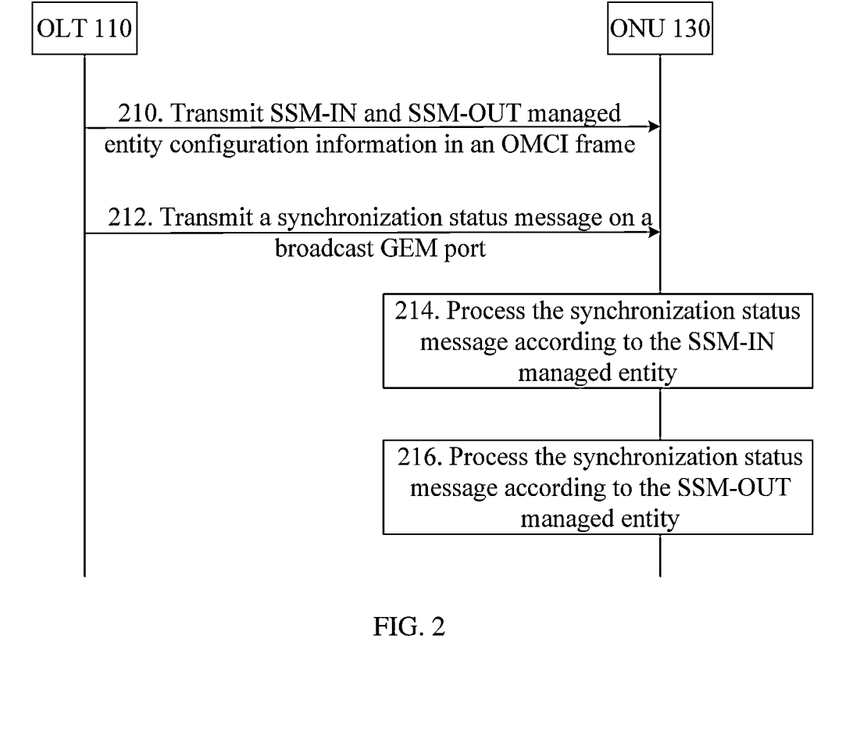
FIG. 2 illustrates an interaction diagram of a method for communication according to an exemplary embodiment of the present disclosure.

The optical line terminal 110 is coupled to a root of one or more optical distribution networks 120 and provides a service node interface (SNI) (not shown). The optical distribution network 120 has a point-to-multipoint optical fiber based setting. FIG. 1 shows a simple optical distribution network 120 that includes a splitter 122. The splitter 122 may be coupled to a PON port on an optical line terminal 110 in an upstream direction through a single optical fiber, and may be coupled to a plurality of optical network units 130 in a downstream direction through a plurality of optical fibers, where three optical network units 130a, 130b and 130c are shown as examples in FIG. 1. The composite optical distribution network may include two or more passive optical distribution segments interconnected by an active device, such as a range extender, and the passive optical distribution segment may itself be a simple optical distribution network. An optical network unit 130 is coupled to leaves of the optical distribution network 120 and is coupled to various user terminals (not shown) through a user network interface (UNI) 132, thereby providing network access services for the terminal devices. FIG. 2 shows user network interfaces 132a, 132b, and 132c associated with the optical network units 130a, 130b, and 130c, respectively. It is to be understood that the optical network unit 130 may be coupled to multiple user terminals through multiple UNI ports.

As shown in FIG. 1, an optical line terminal 110 may be coupled to a plurality of optical network units 130a, 130b, and 130c through the optical distribution network 120 to form a tree structure. The data transmitted from the optical line terminal 110, such as synchronization status messages (SSM), may be received at each of the optical network units 130a, 130b, 130c. The optical line terminal 110 can manage the optical network units 130a, 130b, 130c through an ONU management and control interface (OMCI). However, the optical line terminals and the optical network units from different manufacturers may define different synchronization status message configurations, so the synchronization status message transmitted from the optical line terminal 110 may not be correctly interpreted by the optical network units 130a, 130b, 130c from different manufacturers, and consequently the optical network unit 130 cannot correctly forward the synchronization status message to a user terminal.

The exemplary embodiment of the present disclosure provides a method for managing a synchronization status message through an OMCI management channel. The method is simple and suitable for being implemented between an optical line terminal and an optical network unit, so that configuration, interpretation and further processing of the synchronization status message may be realized. The exemplary embodiments of the present disclosure further provide an apparatus, a computer program product and the like for managing the synchronization status message.

An optical line terminal may implement management of an optical network unit by operating a managed entity (ME) over an OMCI management channel, including configuration management, fault management, performance management, security management, and the like. In some embodiments of the present disclosure, two new managed entities, i.e., a synchronization status message incoming (SSM-IN) managed entity and a synchronization status message outgoing (SSM-OUT) managed entity, are defined for managing the synchronization status messages.

SSM-IN Managed Entity

The SSM-IN managed entity is used to manage a synchronization status message incoming (receiving) function at the optical network unit. The SSM-IN managed entity is capable of enabling and disabling the function of receiving a synchronization status message from a PON port of an optical line terminal on an optical network unit, and deciding whether to submit a synchronization status message received from the PON port to a processor such as a central processing unit (CPU) for processing. The SSM-IN managed entity may have a class number. When the optical network unit has the capability of supporting the SSM-IN managed entity, this capability may be reported to the optical line terminal, so that the optical line terminal knows that it can use the SSM-IN managed entity to manage the optical network unit. For example, the optical network unit may set its managed entity capability attribute to an appropriate bit value to indicate that it has the capability to support SSM-IN managed entities. An instance of the SSM-IN managed entity may be created and deleted by an optical line terminal, and actions performed by the optical line terminal on the SSM-IN managed entity may also include GET, SET, etc. A single instance of an SSM-IN managed entity may be associated with an optical network unit managed entity.

The SSM-IN managed entity may have the following attributes:

Managed Entity Identity (ID): This attribute uniquely identifies each instance of the managed entity;

Virtual Local Area Network (Vlan) ID: This is an optional attribute for determining a Vlan ID of a synchronization status message to be submitted to a processor for processing;

Admin State: This attribute is used to enable and disable the function performed by the managed entity, i.e. enabling and disabling the function of receiving the synchronization status message from the PON port of the optical line terminal.

It should be understood that the SSM-IN managed entity may also have other attributes.

SSM-OUT Managed Entity

The SSM-OUT managed entity is used to manage the synchronization status message outgoing (transmitting) function at the optical network unit. The SSM-OUT managed entity is associated with a Physical Path Termination Point (PPTP) User Network Interface (UNI) managed entity such as a PPTP Ethernet UNI managed entity, a PPTP voice UNI managed entity and the like, and can enable and disable the function of transmitting a synchronization status message to a UNI port on an optical network unit. The SSM-OUT managed entity may have a class number. When the optical network unit supports the SSM-OUT managed entity, its managed entity capability attribute may be set to an appropriate bit value to indicate that it has the capability to support the SSM-OUT managed entity, so that the optical line terminal may use the SSM-OUT managed entity to manage synchronization status message transmission on the UNI port associated with the optical network unit. An instance of the SSM-OUT managed entity may be created and deleted by an optical line terminal, and actions performed by the optical line terminal on the SSM-OUT managed entity may also include GET, SET, etc. An instance of the SSM-OUT managed entity may be associated with a UNI termination point.

The SSM-OUT managed entity may have the following attributes:

Managed Entity Identity (ID): This attribute uniquely identifies each instance of the managed entity;

PPTP UNI pointer: This attribute is associated with a PPTP UNI managed entity to indicate a PPTP UNI bound to an instance of the SSM-OUT managed entity. A value 0 xFFFF indicates an empty pointer;

Admin State: This attribute is used to enable and disable the function performed by the managed entity, i.e. enabling and disabling the function of transmitting a synchronization status message to the UNI port.

It should be understood that the SSM-OUT managed entity may also have other attributes.

Embodiments of managing synchronization status messages for an optical network unit using the SSM-IN and SSM-OUT managed entities are described below. FIG. 2 illustrates an interaction diagram of a method for communication according to an exemplary embodiment of the present disclosure. The method may be performed between an optical line terminal and an optical network unit in a passive optical network, for example, between the optical line terminal 110 and the optical network unit 130 as described above with reference to FIG. 1.

Referring to FIG. 2, at step 210, the optical line terminal 110 may transmit SSM-IN and SSM-OUT managed entity configuration information to the optical network unit 130 through an OMCI management channel. For example, an OMCI message or frame transmitted from the optical line terminal 110 to the optical network unit 130 may include a creation function to create instances of the SSM-IN and SSM-OUT managed entities at the optical network unit 130 initially registered into the passive optical network, and/or may include a setting function to set attribute values of the SSM-IN and SSM-OUT managed entities that have been created at the optical network unit 130. Configuration information of the SSM-IN and SSM-OUT managed entities may be transmitted to the optical network unit 130 in one or more OMCI message frames. As previously described, an instance of the SSM-IN managed entity may be associated with the optical network unit 130 for managing the process of the optical network unit 130 to receive the synchronization status message from the optical line terminal 110; an instance of the SSM-OUT managed entity may be associated with a user network interface terminal point (UNI TP) 132 coupled to the optical network unit 130 for managing the process of the optical network unit 130 to transmit a synchronization status message to the user network interface terminal point 132.

At step 212, the optical line terminal 110 may transmit a synchronization status message to the optical network unit 130 on a GPON Encapsulation Method (GEM) port, such as a broadcast GEM port. In some exemplary embodiments, a processor in the optical line terminal 110 may use an optimal clock source selected from a plurality of clock sources as a synchronization clock, and generate a synchronization status message packet. The generated synchronization status message packet may be transmitted to the optical network unit 130 coupled to the optical line terminal 110 on a broadcast GEM port by an interworking function (IWF) module. The synchronization status message packet may include packet identification information indicating a packet type, and information indicating a synchronization status quality level. In some embodiments, the synchronization status message may further include information such as virtual local area network identification information (Vlan ID), clock source identification information, and transmission hop count.

At step 214, the optical network unit 130 may process the received synchronization status message according to the current configuration of the SSM-IN managed entity. For example, when the SSM-IN managed entity is configured to enable a synchronization status message incoming (receiving) function, a switch chip in the optical network unit 130 may submit a synchronization status message received on the broadcast GEM port to a processor such as a central processing unit for further processing. When a valid value is set in the Vlan ID attribute of the SSM-IN managed entity, the switching chip in the optical network unit 130 can submit the synchronization status message with the same Vlan ID to the processor for further processing. When the SSM-IN managed entity is configured to disable the synchronization status message incoming (receiving) function, the optical network unit 130 may ignore the synchronization status message broadcast by the optical line terminal 110 on the broadcast GEM port.

When the SSM-IN managed entity is configured to enable a synchronization status message incoming (receiving) function, at step 216, the processor of the optical network unit 130 may further process the synchronization status message according to the current configuration of the SSM-OUT managed entity. For example, if an instance of an SSM-OUT managed entity associated with a UNI port is configured to enable a synchronization status message outgoing function, the optical network unit 130 may replace a source media access control (MAC) address of a received synchronization status message with a UNI port MAC address, and then transmit a synchronization status message on the UNI port to a user terminal coupled to the UNI port. For another example, if the instance of the SSM-OUT managed entity associated with the UNI port is configured to disable the synchronization status message outgoing function, the optical network unit 130 does not transmit the received synchronization status message on the UNI port.

Therefore, in the process shown in FIG. 2, the optical line terminal 110 and the optical network unit 130 may implement collaborative management of the synchronization status message based on the SSM-IN and the SSM-OUT managed entities, thereby correctly interpreting the synchronization status message between the optical line terminal 110 and the optical network unit 130. Moreover, the optical network unit 130 can independently control the transmission of the synchronization status message on the plurality of UNI ports by using the SSM-OUT managed entity.

Figure 3:
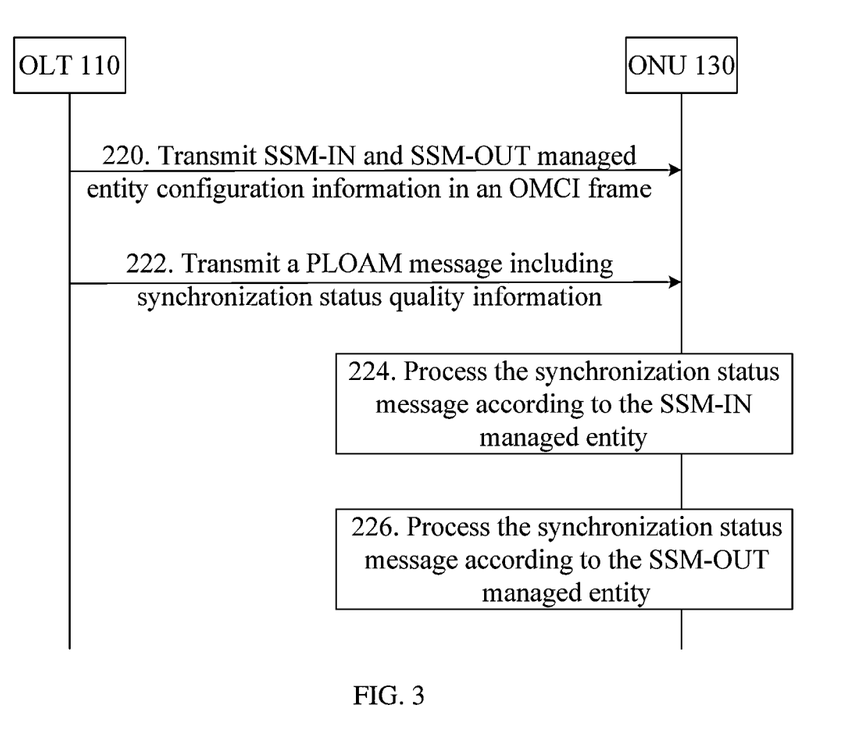
FIG. 3 illustrates an interaction diagram of a method for communication according to another exemplary embodiment of the present disclosure.

FIG. 3 illustrates an interaction diagram of a method for communication according to another exemplary embodiment of the present disclosure. The method may be performed between an optical line terminal and an optical network unit in a passive optical network, for example, between the optical line terminal 110 and the optical network unit 130 as described above with reference to FIG. 1. The process shown in FIG. 3 is similar in some respects to the process shown in FIG. 2, so the differences between the two are mainly described below, and some repetitive descriptions are omitted.

Referring to FIG. 3, at step 220, the optical line terminal 110 may transmit SSM-IN and SSM-OUT managed entity configuration information to the optical network unit 130 through the OMCI management channel. Step 220 may be similar to step 210 shown in FIG. 2, and repetitive description thereof is omitted herein.

At step 222, the optical line terminal 110 may transmit synchronization status message (SSM) quality information to the optical network unit 130 through a physical layer operation management and maintenance (PLOAM) message, the synchronization status message (SSM) quality information indicating a current synchronization quality level of the optical line terminal 110. In some exemplary embodiments, a processor in an optical line terminal 110 may select an optimal clock quality from a plurality of clock sources and transmit the SSM quality information to an optical network unit 130 on a PON MAC port. The PLOAM message may be a unicast message or a broadcast message. In some embodiments, the optical line terminal 110 may transmit the SSM quality level information to the plurality of optical network terminals 130 coupled thereto via the PLOAM broadcast message. The PLOAM broadcast message may be transmitted when the synchronization status quality level at the optical line terminal 110 changes, or may be periodically transmitted at a predetermined time interval. In some embodiments, a PLOAM message for carrying SSM quality level information may include a field indicating a target optical network unit (which indicates all optical network units in a broadcast message), a message ID field indicating that the message carries SSM quality level information, and a message content field containing SSM quality level information, etc. The SSM quality level information may include a predefined code indicative of a quality level, such as a European Telecommunications Standardization Institute (ETSI) SSM Quality Level Coding or an American National Standards Institute (ANSI) SSM Quality Level Coding. Different from the synchronization status message transmitted on the broadcast GEM port in step 212 shown in FIG. 2, the SSM quality level information may only need to be transmitted in step 222 without generating a complete synchronization status message.

At step 224, the optical network unit 130 may process the received synchronization status quality information according to the current configuration of the SSM-IN managed entity. For example, when the SSM-IN managed entity is configured to enable a synchronization status message incoming (receiving) function, the optical network unit 130 may decode the PLOAM message including synchronization status quality level information received on the MAC port to obtain synchronization status quality level information, and store the obtained synchronization status quality level information. When the SSM-IN managed entity is configured to disable the synchronization status message incoming (receiving) function, the optical network unit 130 may ignore the PLOAM message containing the synchronization status quality information.

When the SSM-IN managed entity is configured to enable a synchronization status message incoming (receiving) function, at step 226, the processor of the optical network unit 130 may further process the synchronization status quality level information according to the current configuration of the SSM-OUT managed entity. For example, if the instance of the SSM-OUT managed entity associated with the UNI port is configured to enable the synchronization status message outgoing function, the optical network unit 130 may generate a packet of the synchronization status message based on the received synchronization status quality level information, use the UNI port MAC address as the source MAC address in the synchronization status message, and then transmit the synchronization status message on the UNI port to the user terminal coupled to the UNI port. For another example, if the instance of the SSM-OUT managed entity associated with the UNI port is configured to disable the synchronization status message outgoing function, the optical network unit 130 does not transmit the generated synchronization status message on the UNI port.

Therefore, in the process shown in FIG. 3, the optical line terminal 110 and the optical network unit 130 may implement collaborative management of the synchronization status message based on the SSM-IN and the SSM-OUT managed entities, thereby correctly interpreting the synchronization status message between the optical line terminal 110 and the optical network unit 130. Moreover, the optical network unit 130 can independently control the transmission of the synchronization status message on the plurality of UNI ports by using the SSM-OUT managed entity.

Figure 4:
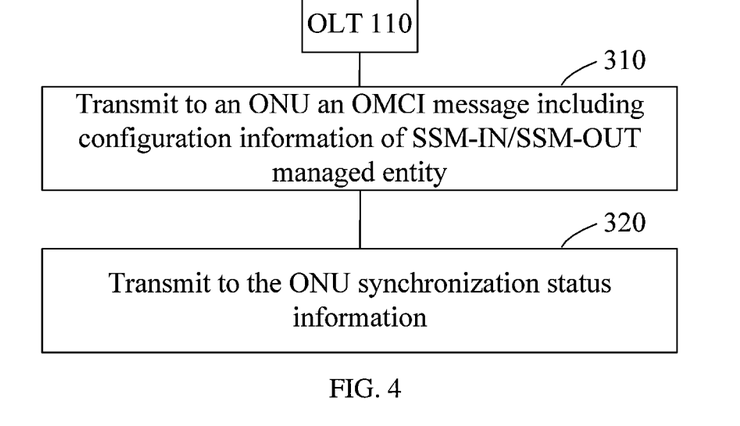
FIG. 4 illustrates a flowchart of a method for communication implemented at an optical line terminal according to an exemplary embodiment of the present disclosure.

FIG. 4 illustrates a flowchart of a method for communication implemented at an optical line terminal, such as the optical line terminal 110 described above with reference to FIG. 1, according to an exemplary embodiment of the present disclosure. It will be understood that some details of the method shown in FIG. 4 have been described above with reference to FIGS. 2-3, and therefore will be briefly described herein.

Referring to FIG. 4, at step 310, the optical line terminal 110 may transmit an OMCI frame or message to an optical network unit 130 coupled thereto, and the OMCI message may include configuration information of the SSM-IN managed entity. As previously described, the SSM-IN managed entity may be associated with the optical network unit 130 and may include attributes such as a managed entity ID, a Vlan ID, an admin state, and the like. In some embodiments, the OMCI message may also include configuration information for the SSM-OUT managed entity. As previously described, the SSM-OUT managed entity may be associated with a user network interface (UNI) and may include attributes such as a managed entity ID, a PPTP UNI pointer, an admin state, etc. In some embodiments, the optical line terminal 110 may transmit configuration information of the SSM-IN and SSM-OUT managed entities through a plurality of OMCI messages.

At step 320, the optical line terminal 110 may transmit synchronization status information to the optical network unit 130 coupled thereto. In some embodiments, the synchronization status information transmitted by the optical line terminal 110 may include a packet of a synchronization status message. For example, as in step 212 shown in FIG. 2, the optical line terminal 110 may transmit a packet of the synchronization status message to the optical network unit 130 on the broadcast GEM port. In other embodiments, the synchronization status information transmitted by the optical line terminal 110 may include synchronization status quality level information. For example, as in step 222 shown in FIG. 3, the optical line terminal 110 may transmit a PLOAM message including synchronization status quality level information to the optical network unit 130. The optical line terminal 110 may transmit synchronization status information to the optical network unit 130 when the synchronization status changes, or may periodically transmit synchronization status information.

Figure 5:
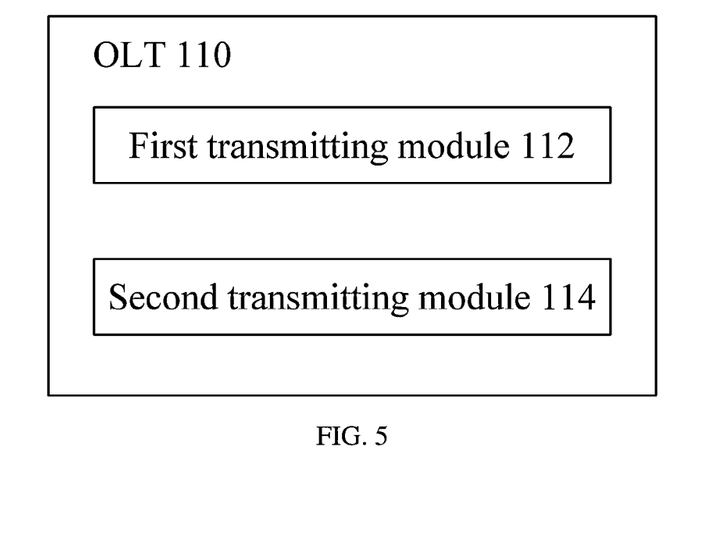
FIG. 5 illustrates a functional block diagram of an optical line terminal according to an exemplary embodiment of the present disclosure.

FIG. 5 illustrates a functional block diagram of an optical line terminal, such as the optical line terminal 110 described above with reference to FIG. 1, according to an exemplary embodiment of the present disclosure. It will be understood that the functional blocks shown in FIG. 5 may be implemented by hardware, software, or a combination of hardware and software to perform the related operations described herein, and the functional blocks shown in FIG. 5 may be combined or divided into sub-blocks to implement the principles of the present disclosure described above. Accordingly, the description herein also supports feasible combinations, divisions, or further definitions of various functional blocks.

Referring to FIG. 5, the optical line terminal 110 may include a first transmitting module 112 and a second transmitting module 114. The first transmitting module 112 may be configured to transmit an OMCI message to the optical network unit 130, where the OMCI message may include configuration information of the SSM-IN managed entity, for example, values of attributes such as a managed entity ID, a Vlan ID, and an admin state of the SSM-IN managed entity. In some embodiments, the OMCI message transmitted by the first transmitting module 112 may further include configuration information of the SSM-OUT managed entity, such as values of attributes such as a managed entity ID, a PPTP UNI pointer, and an admin state. In some embodiments, the first transmitting module 112 may transmit configuration information of the SSM-IN and the SSM-OUT managed entities through a plurality of OMCI messages.

The second transmitting module 114 may be configured to transmit synchronization status information to the optical network unit 130. In some embodiments, the second transmitting module 114 may be configured to transmit a packet of the synchronization status message on the broadcast GEM port. In other embodiments, the second transmitting module 114 may be configured to transmit the synchronization status quality level information through the PLOAM message. The second transmitting module 114 may transmit the synchronization status information to the optical network unit 130 when the synchronization status changes, or periodically transmit the synchronization status information.

Figure 6:
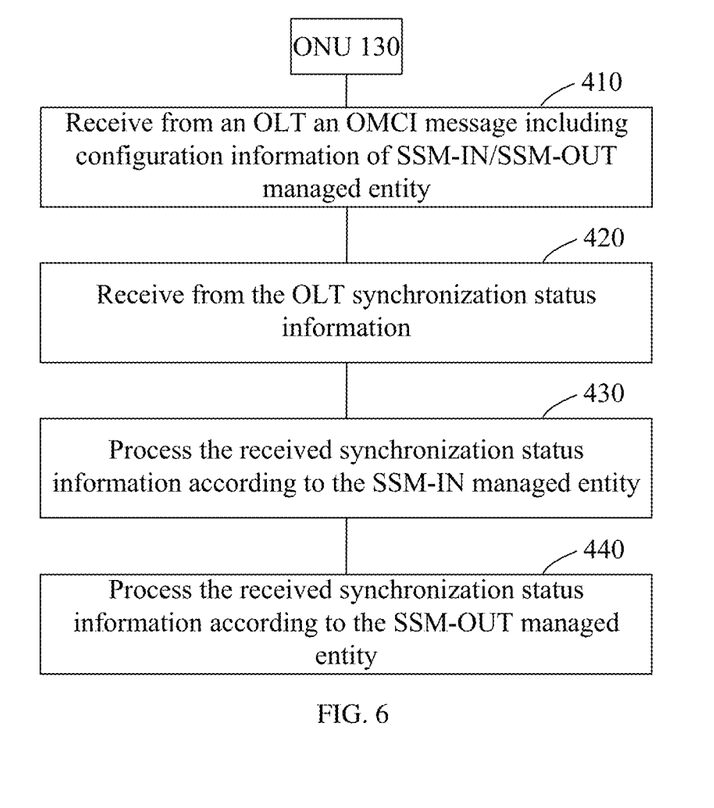
FIG. 6 illustrates a flowchart of a method for communication implemented at an optical network unit according to an exemplary embodiment of the present disclosure.

FIG. 6 illustrates a flowchart of a method for communication implemented at an optical network unit, such as the optical network unit 130 described above with reference to FIG. 1, according to an exemplary embodiment of the present disclosure. It will be understood that some details of the method shown in FIG. 6 have been described above with reference to FIGS. 2-3, and therefore will be briefly described herein.

Referring to FIG. 6, at step 410, the optical network unit 130 may receive an OMCI message from the optical line terminal 110, which may include configuration information of the SSM-IN managed entity, such as values of a managed entity ID, a Vlan ID, an admin state, etc., of the SSM-IN managed entity. In some embodiments, the OMCI message may further include configuration information of the SSM-OUT managed entity, such as values of attributes such as a managed entity ID, a PPTP UNI pointer, and an admin state. In some embodiments, the optical network unit 130 may receive configuration information of the SSM-IN and SSM-OUT managed entities in a separate OMCI message.

At step 420, the optical network unit 130 may receive synchronization status information from the optical line terminal 110. In some embodiments, the optical network unit 130 may receive a packet of a synchronization status message on a broadcast GEM port. In some other embodiments, the optical network unit 130 may receive synchronization status quality level information carried in the PLOAM message. The second transmitting module 114 may transmit the synchronization status information to the optical network unit 130 when the synchronization status changes, or periodically transmit the synchronization status information.

At step 430, the optical network unit 130 may process the received synchronization status information according to the current configuration of the SSM-IN managed entity. For example, when the SSM-IN managed entity is configured to enable a synchronization status message incoming (receiving) function, the optical network unit 130 may submit the synchronization status message packet received on the broadcast GEM port or the synchronization status quality level information received in the PLOAM message to the processor such as the central processing unit for further processing, and the optical network unit 130 may also store the received synchronization status information. When the SSM-IN managed entity is configured to disable the synchronization status message incoming (receiving) function, the optical network unit 130 may ignore the synchronization status message received on the broadcast GEM port and the synchronization status quality level information received in the PLOAM message.

At step 440, the optical network unit 130 may further process the received synchronization status information according to the current configuration of the SSM-OUT managed entity. As described above, the synchronization status information may be a synchronization status message packet received on a broadcast GEM port or synchronization status quality level information received in a PLOAM message. When an instance of the SSM-OUT managed entity associated with the UNI port is configured to enable the synchronization status message outgoing function, the optical network unit 130 may generate a synchronization status message packet based on the received synchronization status information and transmit the synchronization status message packet on the UNI port. If the instance of the SSM-OUT managed entity associated with the UNI port is configured to disable the synchronization status message outgoing function, the optical network unit 130 will not transmit the generated synchronization status message packet on the UNI port.

Figure 7:
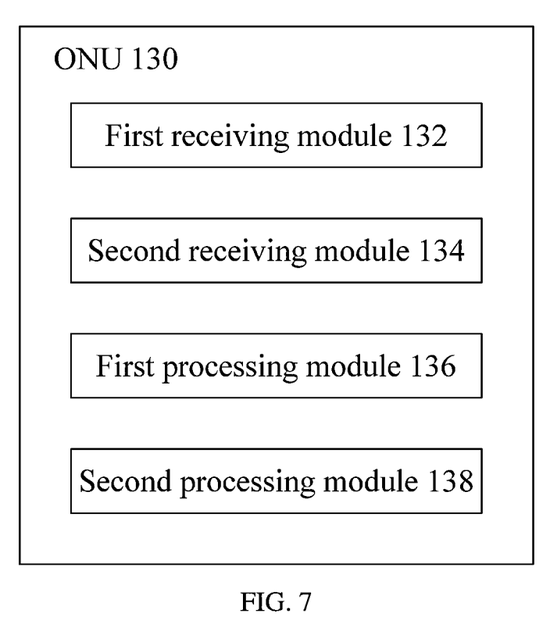
FIG. 7 illustrates a functional block diagram of an optical network unit according to an exemplary embodiment of the present disclosure.

FIG. 7 illustrates a functional block diagram of an optical network unit, such as the optical network unit 130 described above with reference to FIG. 1, according to an exemplary embodiment of the present disclosure. It will be understood that the functional blocks shown in FIG. 7 may be implemented by hardware, software, or a combination of hardware and software to perform the related operations described herein, and the functional blocks shown in FIG. 7 may be combined or divided into sub-blocks to implement the principles of the present disclosure described above. Accordingly, the description herein also supports feasible combinations, divisions, or further definitions of various functional blocks.

Referring to FIG. 7, the optical network unit 130 may include a first receiving module 132, a second receiving module 134, a first processing module 136, and a second processing module 138. The first receiving module 132 may be configured to receive an OMCI message from the optical line terminal 110. The OMCI message may include configuration information of the SSM-IN managed entity, such as values of attributes such as a managed entity ID, a Vlan ID, and an admin state of the SSM-IN managed entity. In some embodiments, the OMCI message received by the first receiving module 132 may further include configuration information of the SSM-OUT managed entity, such as values of attributes such as a managed entity ID, a PPTP UNI pointer, and an admin state. In some embodiments, the first receiving module 132 may receive configuration information of the SSM-IN managed entity and configuration information of the SSM-OUT managed entity in the plurality of OMCI messages.

The second receiving module 134 may be configured to receive synchronization status information from the optical line terminal 110. For example, in some embodiments, the second receiving module 134 may be configured to receive a synchronization status message transmitted on the broadcast GEM port, or in some other embodiments, the second receiving module 134 may be configured to receive synchronization status quality level information in the PLOAM message.

The first processing module 136 may be configured to process the received synchronization status information according to the configuration of the SSM-IN managed entity. For example, when the SSM-IN managed entity is configured to enable the synchronization status message incoming (SSM-IN) function, the first processing module 136 may process the received synchronization status information, for example, decode the OMCI message or the PLOAM message to obtain synchronization status information, and submit the synchronization status information to the second processing module 138 for further processing; when the SSM-IN managed entity is configured to disable the synchronization status message incoming (SSM-IN) function, the first processing module 136 may ignore the received synchronization status information, i.e., ignore the OMCI message and the PLOAM message including the synchronization status information.

The second processing module 138 may be configured to process the received synchronization status information according to the configuration of the SSM-OUT managed entity. In some embodiments, when the SSM-OUT managed entity is configured to enable the synchronization status message outgoing (SSM-OUT) function, the second processing module 138 may generate a synchronization status message packet based on the received synchronization status information and transmit the generated synchronization status message packet on a UNI port associated with the SSM-OUT managed entity. In some embodiments, when the SSM-OUT managed entity is configured to disable the synchronization status message outgoing (SSM-OUT) function, the second processing module 138 will refrain from transmitting the synchronization status message packet on the UNI port associated with the SSM-OUT managed entity.

Figure 8:
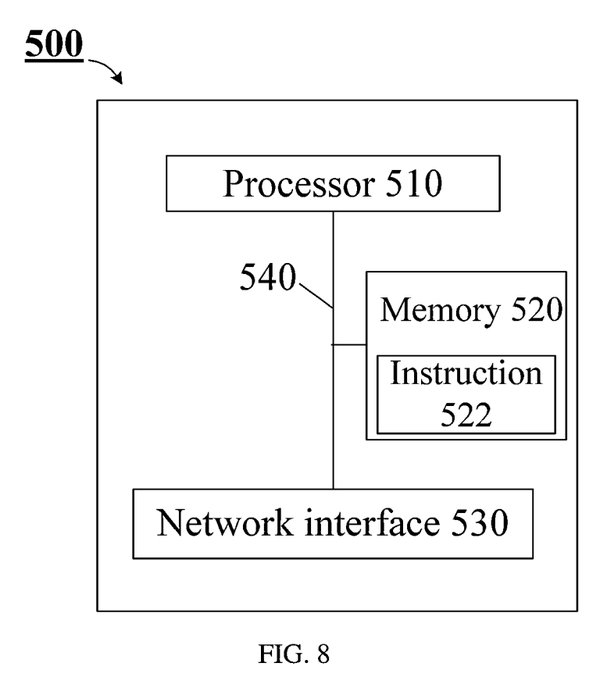
FIG. 8 illustrates a structural block diagram of an electronic device according to an exemplary embodiment of the present disclosure.

FIG. 8 illustrates a structural block diagram of an electronic device 500 according to an exemplary embodiment of the present disclosure. The electronic device 500 may be implemented as the optical line terminal 110 or the optical network unit 130 described above. As shown in FIG. 8, the electronic device 500 may include one or more processors 510, one or more memories 520, and one or more network interfaces 530, which may be communicatively coupled to each other by a bus system 540.

The processor 510 may be, for example, a central processing unit (CPU), a general purpose processor, a controller, a digital signal processor (DSP), an application specific integrated circuit (ASIC), a field programmable gate array (FPGA), or other programmable logic device, transistor logic device, hardware component, or any combination thereof. The processor 510 may run instructions in the memory 520 and/or exchange data therewith to control other components coupled through the bus 540 to cooperatively operate, perform the methods, steps, or functions described above.

The memory 520 may be implemented using any suitable data storage technology, examples of which include, but are not limited to, non-volatile memory and volatile memory, semiconductor memory, magnetic memory, optical memory, network memory, flash memory, electrically erasable programmable read-only memory, buffer memory, registers, and the like. The memory 520 may include computer instructions 522 that may be executed by the processor 510 such that the processor 510 can control other components coupled through the bus 540 to cooperate operate, perform the methods, steps, or functions described above with respect to the optical line terminal 110 or the optical network unit 130.

The network interface 530 may include one or more electrical interfaces and/or optical interfaces. For example, the optical line terminal 110 and the optical network unit 130 may be connected to each other through an optical interface, the optical line terminal 110 may be connected to an upstream switch using an optical interface or an electrical interface, and the optical network unit 130 may be connected to a downstream user terminal using an electrical interface. In some embodiments, the network interface 530 may also include one or more transceiving antennas to facilitate wireless communication.

The embodiment of the present disclosure further provides a computer readable storage medium having a computer program stored therein. The computer program comprises instructions which, when executed by the processor, enables the electronic device to execute the communication method, step or function described above with respect to the optical line terminal 110 or the optical network unit 130.

The embodiment of the present disclosure further provides a computer program product stored on the computer readable storage medium described above. The computer program product may write program code for carrying out operations of embodiments of the present disclosure in any combination of one or more programming languages, including object oriented programming languages, such as Java, C++, etc., and conventional procedural programming languages, such as the "C" language or similar programming languages. The program code may be executed entirely on the local computing device, partly on the local computing device, as a stand-alone software package, partly on the local computing device and partly on the remote computing device, or entirely on the remote computing device or server.

A computer readable storage medium may employ any combination of one or more readable media. The readable medium may be a readable signal medium or a readable storage medium. The readable storage medium may include, for example, but is not limited to, an electronic, magnetic, optical, electromagnetic, infrared, or semiconductor system, apparatus, or device, or any suitable combination of the foregoing. More specific examples (a non-exhaustive list) of the readable storage medium include: an electrical connection having one or more wires, a portable disk, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

The basic principle of the present disclosure is described above with reference to specific embodiments. However, it should be noted that the benefits, advantages, effects, etc. mentioned in the present disclosure are merely examples and are not intended to be limiting, and these benefits, advantages, effects, etc. must not be considered to be possessed by various embodiments of the present disclosure. In addition, the specific details disclosed above are only for the purpose of example and to facilitate understanding, rather than limitation, and the above details are not intended to limit the present disclosure to be implemented by adopting the specific details.

It should also be noted that, in the apparatus, devices and methods of the present disclosure, each component or each step may be decomposed and/or recombined. These decomposition and/or recombination should be considered equivalent solutions of the present disclosure. The execution sequence of each step in the method described in the present disclosure is not limited to the description order, for example, two steps may be executed in different order or performed simultaneously unless the context clearly indicates that the steps should be executed in a specific relative order.

The term "comprising" and variations thereof used in the present disclosure are open-ended including but not limited to "including but not limited to". The term "based on" is "based at least in part on". The term "one embodiment" means "at least one embodiment"; the term "another embodiment" means "at least one further embodiment". Other terms should be understood in a manner similar to that given above, unless context dictates otherwise.

The above description of the disclosed aspects is provided to enable any person skilled in the art to make or use the present disclosure. Various modifications to these aspects will be readily apparent to those skilled in the art, and the generic principles defined herein may be applied to other aspects without departing from the scope of the present disclosure. Thus, the present disclosure is not intended to be limited to the aspects shown herein but is to be accorded the widest scope consistent with the principles and novel features disclosed herein.

The invention claimed is:

1. A method for communication implemented at an optical network unit, comprising:
   receiving an optical network unit management and control interface (OMCI) message from an optical line terminal, the OMCI message comprising configuration information on a synchronization status message incoming (SSM-IN) managed entity;
   receiving synchronization status information from the optical line terminal; and
   processing the received synchronization status information according to the configuration of the SSM-IN managed entity,
   wherein the SSM-IN managed entity includes at least one of a managed entity identifier or an admin state indicating enabling or disabling of an SSM-IN function.

2. The method of claim 1, wherein the SSM-IN managed entity is associated with the optical network unit.

3. The method of claim 1, wherein the SSM-IN managed entity further comprises:
   a virtual local area network identifier of a managed entity indicating a virtual local area network applying the managed entity.

4. The method of claim 1, wherein the receiving the synchronization status information comprises:
   receiving a synchronization status message transmitted on a broadcast gigabit-capable passive optical network encapsulation method (GEM) port; or
   receiving a physical layer operation management and maintenance (PLOAM) message, the PLOAM message comprising synchronization status quality information.

5. The method of claim 1, wherein the processing the received synchronization status information according to the configuration of the SSM-IN managed entity comprises:
   when the SSM-IN managed entity is configured to enable the SSM-IN function, processing the received synchronization status information by a processor; or
   when the SSM-IN managed entity is configured to disable the SSM-IN function, ignoring the received synchronization status information.

6. The method of claim 1, wherein the OMCI message further comprises configuration information of a synchronization status message outgoing (SSM-OUT) managed entity.

7. The method of claim 6, wherein the SSM-OUT managed entity is associated with a user network interface.

8. The method of claim 6, wherein the SSM-OUT managed entity comprises at least one of:
   a second managed entity identifier;
   a physical path termination point user network interface pointer indicating a user network interface associated with the SSM-OUT managed entity; or
   a second admin state indicating enabling or disabling of an SSM-OUT function.

9. The method of claim 6, wherein when the SSM-IN managed entity is configured to enable the SSM-IN function, the method further comprises:
processing the received synchronization status information according to the configuration of the SSM-OUT managed entity.

10. The method of claim 9, wherein the processing the received synchronization status information according to the configuration of the SSM-OUT managed entity comprises:
when the SSM-OUT managed entity is configured to enable a SSM-OUT function, generating a synchronization status message based on the received synchronization status information, and transmitting the synchronization status message on a user network interface associated with the SSM-OUT managed entity; or
when the SSM-OUT managed entity is configured to disable the SSM-OUT function, disabling transmitting the synchronization status message on the user network interface associated with the SSM-OUT managed entity.

11. An optical network unit, comprising:
at least one processor; and
at least one memory having stored thereon instructions that, when executed by the at least one processor, cause the optical network unit to perform the method of claim 1.

12. A method for communication implemented at an optical line terminal, comprising:
transmitting an optical network unit management and control interface (OMCI) message to an optical network unit, the OMCI message comprising configuration information on a synchronization status message incoming (SSM-IN) managed entity; and
transmitting synchronization status information to the optical network unit,
wherein the SSM-IN managed entity includes at least one of a managed entity identifier or an admin state indicating enabling or disabling of an SSM-IN function.

13. The method of claim 12, wherein the SSM-IN managed entity is associated with the optical network unit.

14. The method of claim 12, wherein the SSM-IN managed entity further comprises:
a virtual local area network identifier of a managed entity indicating a virtual local area network applying the managed entity.

15. The method of claim 12, wherein the transmitting the synchronization status information comprises:
transmitting the synchronization status message on a broadcast gigabit-capable passive optical network encapsulation method (GEM) port; or
transmitting a physical layer operation management and maintenance (PLOAM) message, the PLOAM message comprising synchronization status quality information.

16. The method of claim 12, wherein the OMCI message further comprises configuration information of a synchronization status message outgoing (SSM-OUT) managed entity.

17. The method of claim 16, wherein the SSM-OUT managed entity is associated with a user network interface.

18. The method of claim 16, wherein the SSM-OUT managed entity comprises at least one of:
a second managed entity identifier;
a physical path termination point user network interface pointer indicating a user network interface associated with the SSM-OUT managed entity; or
a second admin state indicating enabling or disabling of an SSM-OUT function.

19. An optical line terminal, comprising:
at least one processor; and
at least one memory having stored thereon instructions that, when executed by the at least one processor, cause the optical line terminal to perform the method of claim 12.

20. A method for communication implemented at an optical network unit, comprising:
receiving an optical network unit management and control interface (OMCI) message from an optical line terminal, the OMCI message comprising configuration information on a synchronization status message incoming (SSM-IN) managed entity and configuration information of a synchronization status message outgoing (SSM-OUT) managed entity;
receiving synchronization status information from the optical line terminal; and
processing the received synchronization status information according to the configuration of the SSM-IN managed entity.

* * * * *